(No Model.)
E. K. SUMERWELL.
VESSEL FOR HEATING OR COOLING FRUIT, MILK, &c.
No. 358,085. Patented Feb. 22, 1887.
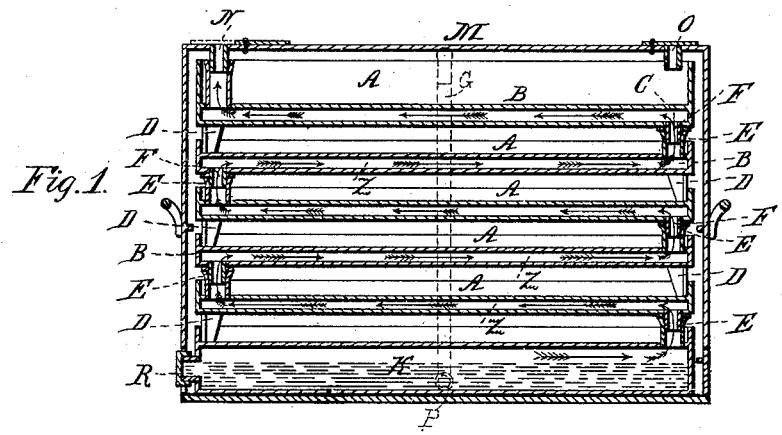
Fig. 1.
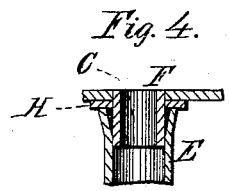
Fig. 4.
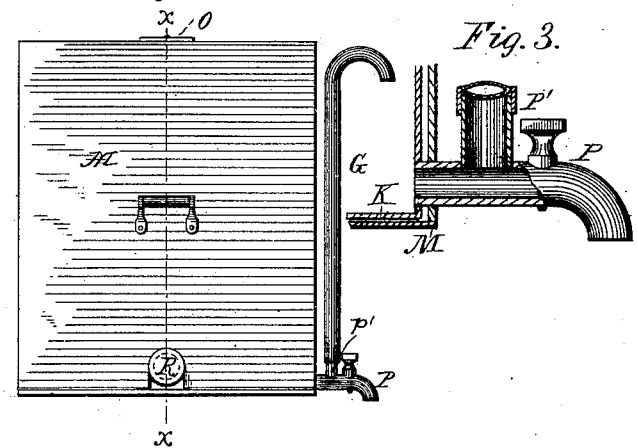
Fig. 2.
Fig. 3.
Witnesses:
W. C. Jirdinston.
E. W. Rector
Inventor:
E. K. Sumerwell
Stem Peck
his Attorneys.

UNITED STATES PATENT OFFICE.

EDWARD K. SUMERWELL, OF COVINGTON, KENTUCKY.

VESSEL FOR HEATING OR COOLING FRUIT, MILK, &c.

SPECIFICATION forming part of Letters Patent No. 358,085, dated February 22, 1887.

Application filed August 3, 1885. Serial No. 173,332. (No model.)

*To all whom it may concern:*

Be it known that I, EDWARD K. SUMERWELL, a citizen of the United States, residing at Covington, in the county of Kenton and State of Kentucky, have invented certain new and useful Improvements in Vessels for Heating or Cooling Fruit, Milk, and other Articles, of which the following is a full, clear, and exact description, reference being had to the accompanying drawings, forming part of this specification.

My invention is an improvement in household utensils used for heating or cooling fruit, milk, or other articles; and it consists in certain novel details of construction and combinations of parts, which will be hereinafter fully described, and then clearly pointed out in the claims.

In the accompanying drawings, Figure 1 is a side elevation of a nest or column of vessels in section, taken through the dotted line *x x* of Fig. 2. Fig. 2 is an end elevation of the same incased in a jacket or hood. Fig. 3 is a side view of the exit-pipe and faucet, partly in section. Fig. 4 is a sectional view of the connecting-joint between different vessels.

The same letters of reference are used to indicate identical parts in all the figures.

In Fig. 1, A A are a series of vessels, provided with false bottoms B B. These false bottoms have a space or chamber, Z, between the base of the pan and the intermediate or false bottom. These vessels are arranged one above the other, resting on feet or legs D. At the opposite sides or corners of each alternate pan or vessel is a spout, E, extending from the lower chamber up to the top of the pan, and a corresponding tube, F, extending downward from the pan above and fitting into the mouth of the tube E, so that when the pans are set one above the other the spouts F fit into the spouts E and the chambers Z are all connected. The bottom pan should be made deeper than the others; or a supplemental water-tank, K, should be used, connected in the manner described with the chambers Z.

M is a hood or jacket of tin fitting over and inclosing the whole. The bottom pan or water-tank, K, being set on a stove, the heat produces steam, which passes in the direction of the arrows through the chambers Z and out through the opening N. This opening N is provided with a door, which, if desired, may be closed to retain the steam, which then passes through the pans, mingling with their contents and steaming them. The opening O, also provided with a door, may be opened for the escape of vapors arising from the contents of the vessels.

R is a nozzle, to which a pipe or tube may be attached for introducing steam generated out of the machine.

The device may be used on any stove, and as the steam radiates the heat in all directions, both up on the contents of the pan above and down on the contents of the pan below, the heat is evenly and thoroughly distributed, and is very efficacious in drying fruit and the like.

The faucet P may be used to drain the chambers or empty the tank K. It is provided with an upwardly-extending branch or arm, P', rising to the height of the tank K. By inserting a funnel in the arm P' the tank K may be filled with water. This arm P' may be provided with a cap containing a small opening or signal-whistle, so that when the water in the tank K gets below the top of the opening into the faucet P the steam will escape through the whistle and indicate the low stage of the water.

In Fig. 4, H is a ring of felt or other packing, so that when the spout F is fitted into the larger spout E a tight joint will be made, to prevent the escape of steam.

When the machine is used as a cooler, cold water is introduced at N, which passes in a direction opposite to that indicated in the arrows and taken by the steam, passing out of the faucet P; or an overflow-pipe, G, may be attached to the arm P', which rises to the height of the top of the column of pans. The faucet P then being closed, the water will not flow out until the chambers are full and the water in the supply-pipe N rises higher than the bend in the overflow-pipe G. The water rapidly absorbs the heat from the contents of the shallow vessels and reduces their temperature to about the same as that of the water.

By this series of vessels, arranged as described, I am able to bring the contents of the vessels into more immediate and intimate contact with the heating or cooling medium and produce a better and most satisfactory result.

Having thus fully described my invention, I claim—

1. The combination, with jacket M, provided with a water-tank, K, at its bottom, and having a discharge-outlet, N, for the steam and a like outlet, O, for the escape of vapors arising from the contents of the vessels in its top, of a series of pans, A, having false or double bottoms arranged vertically over the said tank and communicating with each other and with the tank by means of tubes E, disposed alternately at opposite sides of the pans, substantially as described.

2. The combination, with jacket M, provided with a water-tank, K, at its bottom and a series of false-bottomed pans, A, arranged vertically over said tank and in communication therewith and with each other, of faucet P, provided with an upwardly-extending arm, P', substantially as described, and for the purpose set forth.

3. The combination, with jacket M and water-tank K at the bottom thereof, of faucet P, having an upwardly-extending arm, P', provided with a perforated cap, substantially as described, and for the purpose set forth.

EDWARD K. SUMERWELL.

Witnesses:
EDWARD W. RECTOR,
OTTO RICHTER.